(Model.)
G. E. STEAD.
CONVEYER BELT.
No. 501,218. Patented July 11, 1893.
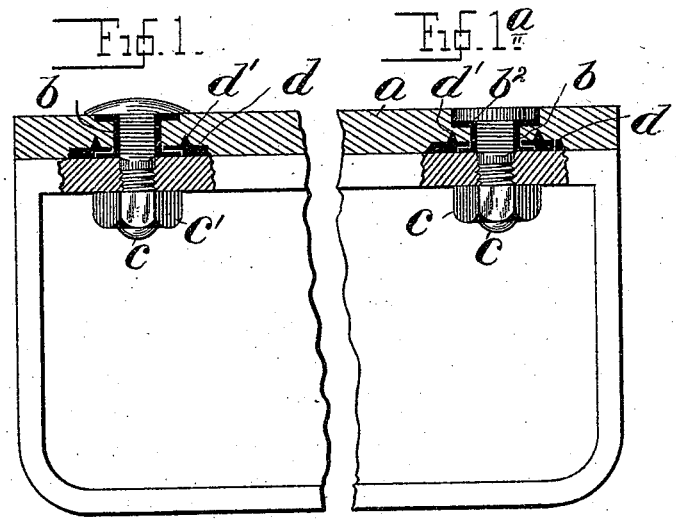
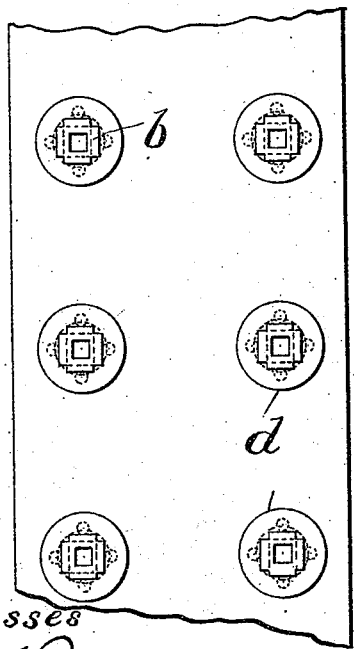
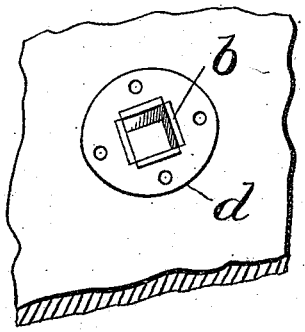
Witnesses
Wm H Courtland
Leocadia M Lennan
Inventor
G. E. Stead
By his Attorney
Edward P. Thompson

UNITED STATES PATENT OFFICE.

GEORGE EDDISON STEAD, OF LEEDS, ENGLAND.

CONVEYER-BELT.

SPECIFICATION forming part of Letters Patent No. 501,218, dated July 11, 1893.

Application filed August 6, 1892. Serial No. 442,374. (Model.)

*To all whom it may concern:*

Be it known that I, GEORGE EDDISON STEAD, a subject of the Queen of Great Britain, residing at Leeds, in the county of York, and in the Kingdom of Great Britain, have invented certain new and useful Improvements in Belts, of which the following is a specification.

This invention relates to belts or straps and is more particularly applicable to elevator belts and consists in the combination with said belts or straps of metal eyelets inserted into them.

On the drawings appended hereunto and forming part of this specification, Figure 1 shows a belt with inserted eyelets in section and elevator buckets in top view. Fig. 1$^a$ is a view similar to Fig. 1. of a modification; Fig. 2 a view of a belt with eyelets arranged in straight rows. Fig. 3 is a perspective of the eyelet whose construction is one of the most important features of my invention.

In elevators for flour and grain small buckets or cans are bolted to a belt passing round pulleys at the top and bottom for which purpose holes have to be punched into the belt and across the same at regular intervals through which holes the bolts are passed, an operation requiring much time and often unskillfully performed at the mill, besides which the belts are liable to become worn oblong and be frayed by the bolts and do not effectually prevent the bolts to which the buckets or cans are attached from turning round. One of the objects of my invention is to remedy these inconveniences, which I effect as follows:

I insert into the belt $a$ metal eyelets $b$ preferably made square, at regular intervals across the belt, as shown by Fig. 2 so as to form two or more longitudinal rows of eyelets according to the width of the belt and number of bolts required for attaching the bucket. The eyelets may be formed simply as square tubes with flanges at one end, the edges at the other end being turned over the edges of the holes and down flat upon the same, as shown on Fig. 1, on the left or they may be made as shown on the right partly square and fitting the square of the bolt $c$ and partly enlarged to form a round or square dish $b^2$ on the face of the belt into which the head of the bolt $c$ enters and thus is sunk below or level with the side of the belt passing round the pulleys, thus producing a greater adhesion of the belt on the pulleys than when the bolt heads project as shown at $c$ Fig. 1. By preference a square holed washer $d$ is placed upon the belt under the edges of the eyelet that are pressed over, said washer being provided with spikes $d'$ that enter into the belt and assist in preventing the eyelet from turning in the belt when the nut $c'$ is screwed up or unscrewed. In inserting these eyelets with enlarged dishes the belt is compressed during their insertion if made of textile or other compressible materials, or it may be partly cut away by means of suitable augers or cutters when made of leather or other less compressible materials.

In addition to the eyelets for the bolts there may be other square or round eyelets inserted into the belt for the purpose of letting the air escape between the belt and pulley and thereby increase the adhesion of the belt on the pulley.

I claim—

1. The combination with a belt, of a tube with a flange at one end pressing against one side of the belt, a washer placed upon the opposite side of the belt, and spikes upon the washer entering the belt, the edges of the tube being turned over the inner edge of the washer and down flat upon the same.

2. The combination with a belt, of a square tube with a flange at one end pressing against one side of the belt, a washer placed upon the opposite side of the belt, and spikes upon the washer entering the belt the corners of the square tube opposite the said flange being cut through a part of the length of the tube and the ends of the tube being bent down upon the inner edge of said flange.

3. The combination with a belt, of a tube with a flange at one end pressing against one side of the belt, a washer placed upon the opposite side of the belt, and spikes upon the washer entering the belt, the edges of the tube being turned over the inner edge of the washer and down flat upon the same, a bucket, and a bolt passing through said tubes and secured to said bucket.

In testimony whereof I have hereto affixed my signature in presence of two witnesses.

GEORGE EDDISON STEAD.

Witnesses:
RICHARD BUCKLE,
   16 *Selby St., Leeds.*
WILLIAM MIDGLEY WOOD,
   8 *Cardigan St., Leeds.*